April 25, 1933.   W. J. WILLIAMS   1,905,200
MECHANISM FOR RECORDING ROTATION OF A WELL SURVEYING INSTRUMENT
Filed Nov. 20, 1929   3 Sheets-Sheet 1
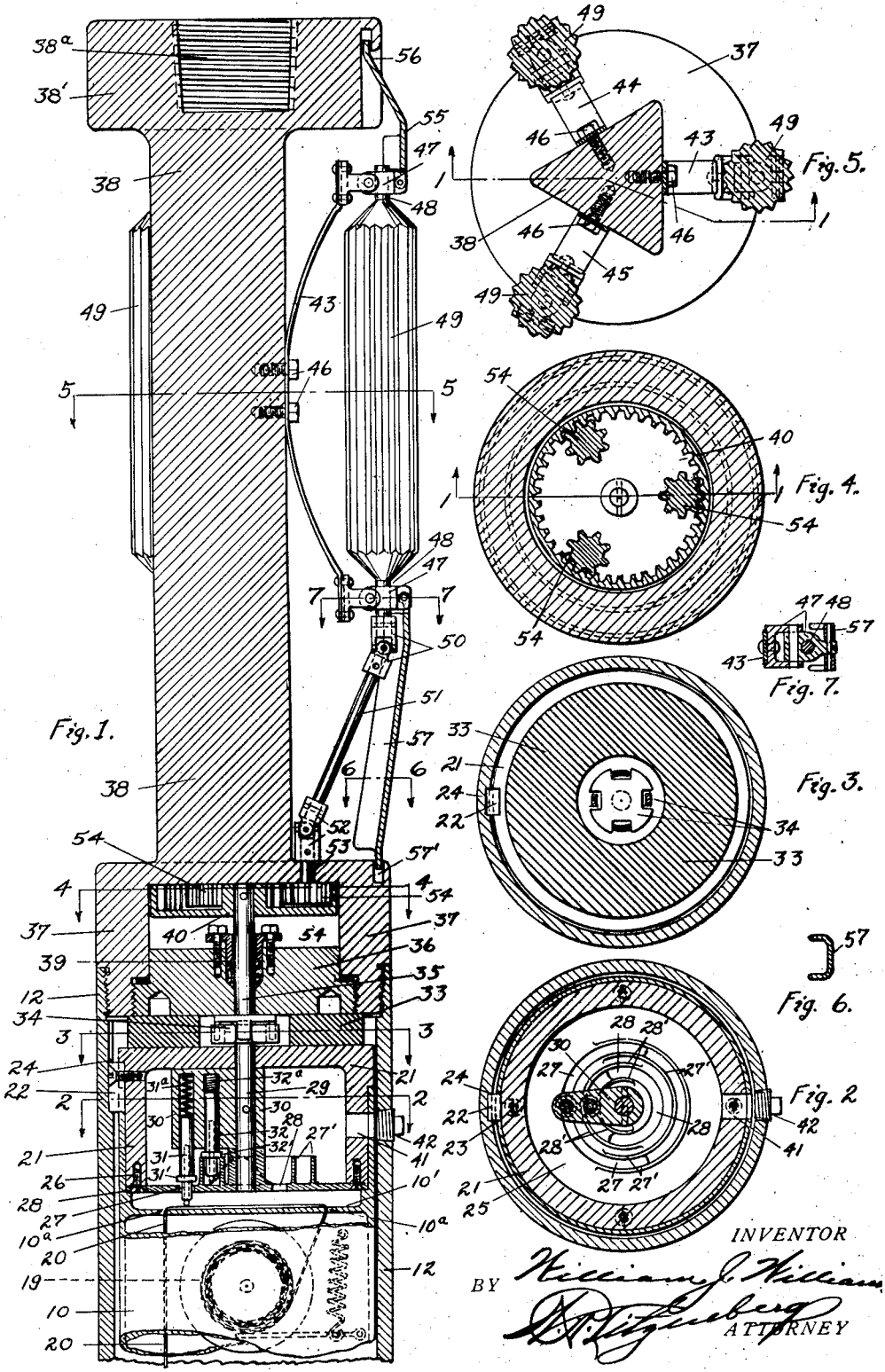

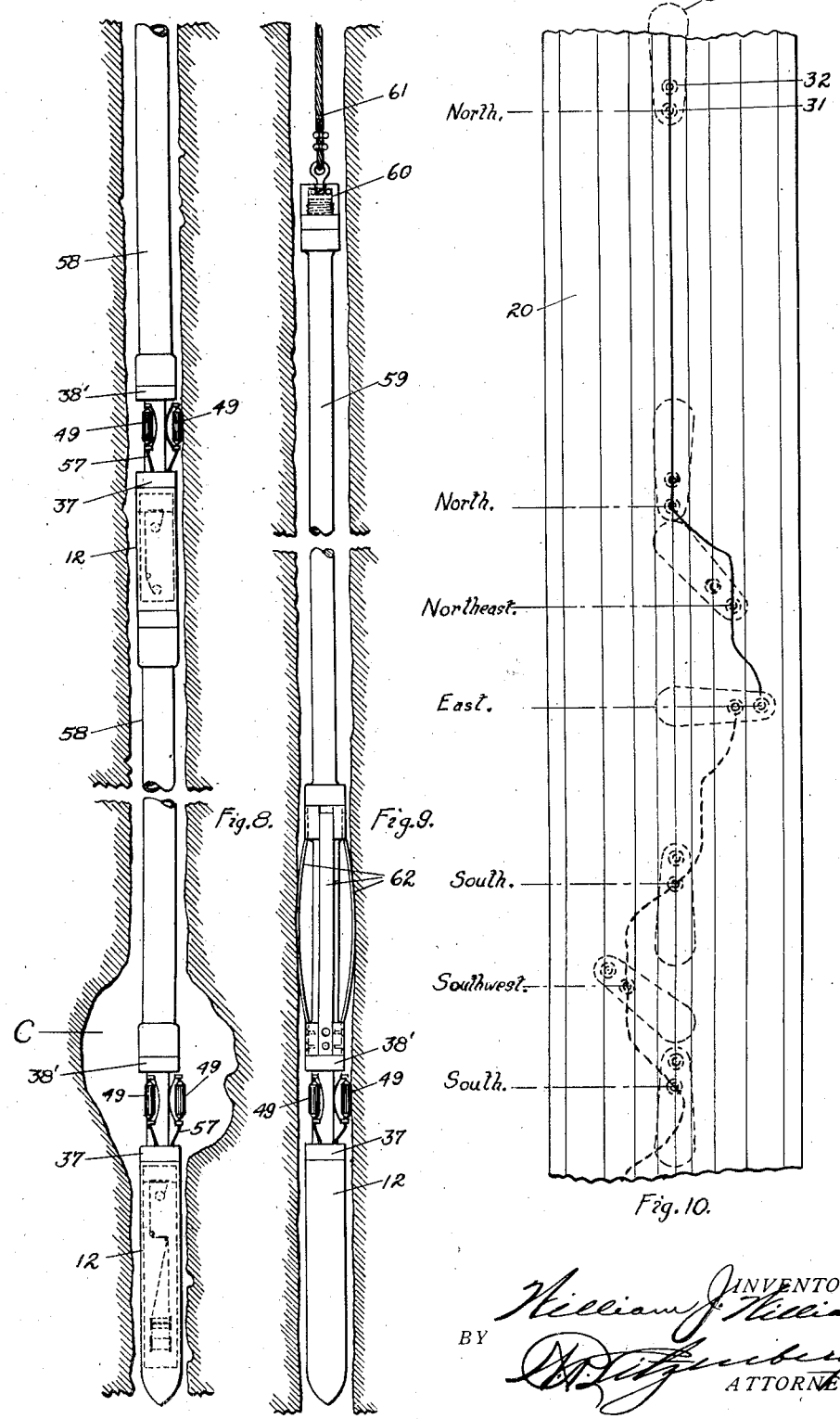

April 25, 1933.   W. J. WILLIAMS   1,905,200
MECHANISM FOR RECORDING ROTATION OF A WELL SURVEYING INSTRUMENT
Filed Nov. 20, 1929   3 Sheets-Sheet 3
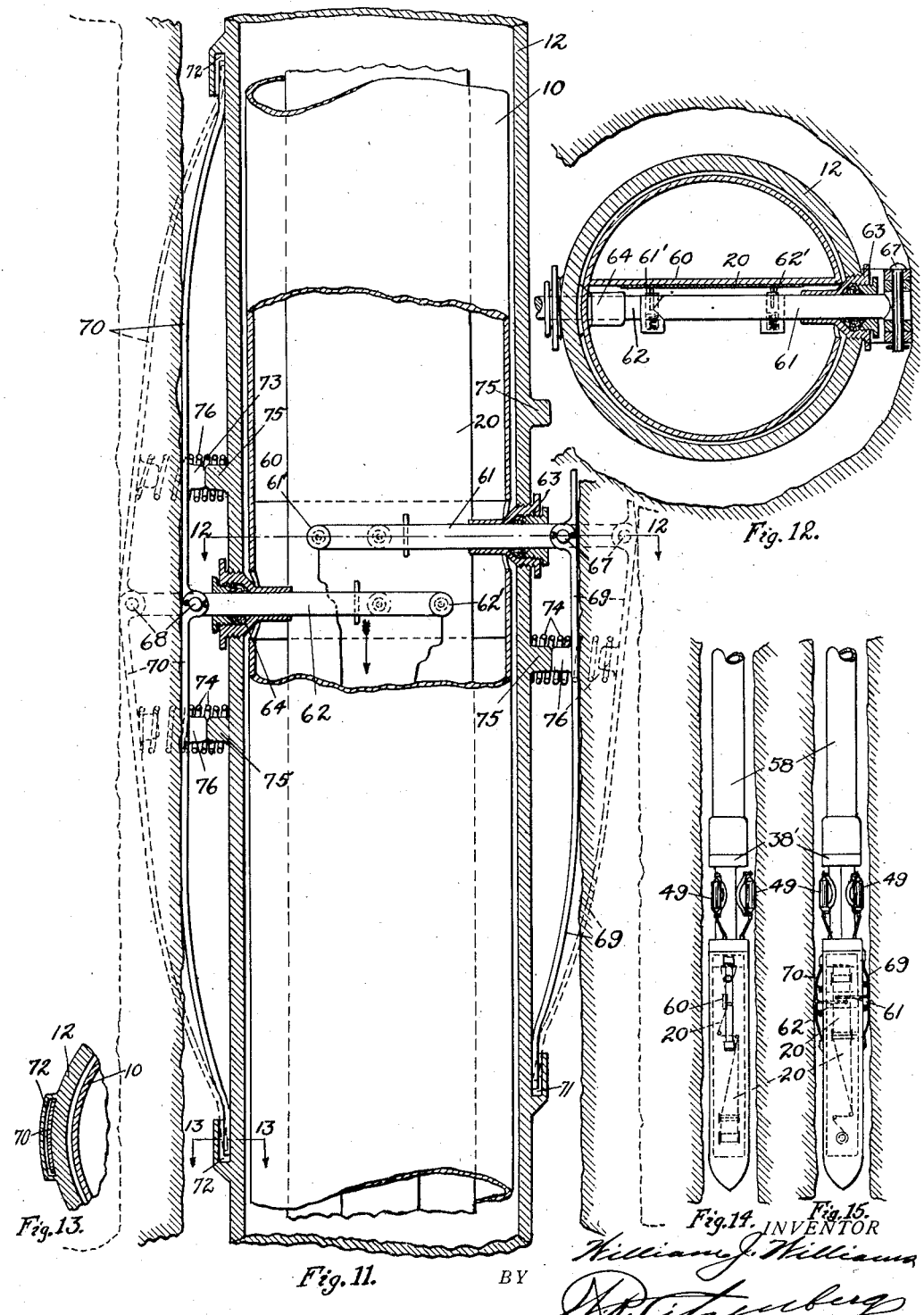

Patented Apr. 25, 1933

1,905,200

UNITED STATES PATENT OFFICE

WILLIAM J. WILLIAMS, OF SOUTH GATE, CALIFORNIA, ASSIGNOR OF ONE-HALF TO L. A. WAGNER, OF LOS ANGELES, CALIFORNIA

MECHANISM FOR RECORDING ROTATION OF A WELL SURVEYING INSTRUMENT

Application filed November 20, 1929. Serial No. 408,507.

My invention relates to mechanism for recording rotation of a well surveying instrument as it moves into a well and is intended to be used in connection with the instrument described in my pending application Serial No. 364,354, for mechanism for determining deviation of wells from the perpendicular, or other instrument for surveying or determining the condition of a deep well.

Among the salient objects of this invention are to provide an instrument having wall engaging elements adapted to actuate said instrument for indicating any rotation taking place in said instrument; to provide an instrument which can be connected to a drill pipe and lowered into a well therewith and which will record any rotation of the pipe; to provide in an instrument of the character referred to a plurality of marking devices adapted to be moved into and out of marking engagement with a tape or sheet for indicating thereon the rotation movement of the instrument about its axis; to provide in an instrument of the character referred to marking devices and wall engaging elements with interconnections therebetween whereby the marking devices are controlled by the wall engaging elements; to provide in an instrument of the character referred to yieldingly mounted and interconnected actuating or controlling elements which are operated by contact with the wall of the well; to provide in connection with such an instrument means for recording or indicating on the tape or sheet any increase or decrease in the size or diameter of the well which might change the calculation or record of the instrument for recording the rotation; and, in general, to provide a simple, practical and efficient instrument for making a graph of a well.

In order to explain my invention I have illustrated on the accompanying three sheets of drawings, one practical embodiment thereof, which I will now describe.

Figure 1 is a vertical sectional view through an instrument embodying my invention, taken on line 1—1 of Figs. 4 and 5;

Figure 2 is a cross sectional view taken on line 2—2 of Fig. 1;

Figure 3 is a cross sectional view taken on line 3—3 of Fig. 1;

Figure 4 is a cross sectional view taken on line 4—4 of Fig. 1;

Figure 5 is a cross sectional view taken on line 5—5 of Fig. 1;

Figure 6 is a cross sectional detail taken on line 6—6 of Fig. 1;

Figure 7 is a cross sectional detail taken on line 7—7 of Fig. 1;

Figure 8 is a view of a well showing a line of drill pipe with two of my instruments connected thereinto, to overcome the problem of a cavity where the instrument cannot contact the wall of the well;

Figure 9 is a view of a well into which my instrument is being lowered by means of a cable and showing spring or guide centering means associated therewith;

Figure 10 shows a record such as would be made by the instrument;

Figure 11 is a sectional view through a section of drill casing showing an instrument for recording any increase in the diameter of the well, and adapted to be connected in association with the twist indicating mechanism;

Figure 12 is a cross sectional view taken on line 12—12 of Fig. 11;

Figure 13 is a fragmentary sectional detail taken on line 13—13 of Fig. 11;

Figure 14 is a general view indicating in light broken lines how my instruments are cooperatively connected together; and Figure 15 is a similar view from the side of Fig. 14.

Referring now in detail to the drawings, in Fig. 1, a roll of tape, designated 19, as in the pending application, instead of feeding downwardly through the tube or case 10, as in the above-identified application, is carried upwardly through a table 10' formed as a part of the upper end of said tube 10, with slots as 10ª, therethrough, whereby the tape, designated 20, is carried up through said table 10', across the same and thence down through said table and down into the tube 10 toward the other mechanism, above referred to as forming the subject matter of another case. The upper end of said tube 10, is open to receive an interfitting body 21, provided with a key 22, secured to its side, and fitting down into a slot 23, in the upper end of said tube 10, and also fitting into a key-way 24, in the inside of an outer case or housing, designated 12, as in said former case. This insures the proper positioning of said body 21, in the case or tube 10, relative to the tape 20, and its direction of movement, and interlocks said body, tube and outer housing together by means of said key 22.

Said body 21, is provided with a floor plate 25, detachably secured thereto by means of screws, 26, and with two concentric slots 27, and 28, one within the other, as seen in Fig. 2, with their ends in overlapping positions, as indicated in said Fig. 2. Said concentric slots 27 and 28, are continued from their ends in the form of cams, as 27' and 28', so that each slot with its spaced cams forms a complete circle, one within the other, as will be clear from Fig. 2, taken in connection with Fig. 1.

Revolubly mounted through said body 21, is a shaft 29, on which, within said body, is carried an arm or block 30, having two pencils 31 and 32, telescopically mounted therein, each provided with a collar, as 31' and 32', adapted to ride the cams while revolving with said shaft 29, or to descend to allow the pencils to protrude through said slots 27 or 28, as the case may be. One pencil is one color and the other is another color, or otherwise differentiated. The pencil 31, it will be seen is down through the slot 27, Fig. 1, while the pencil 32 is raised and is riding its cam 28'. Said pencils 31 and 32, are spring pressed downwardly, as clearly indicated by springs designed 31ª and 32ª. Thus it will be seen that as the shaft 29 with its arm 30, is revolved, or is maintained in a given position, as hereinafter described, one pencil will be down in marking contact with the tape 20, at one side of the axis of said shaft 29, or the other pencil will be down in marking contact with said tape at the other side of the shaft, one pencil marking in one color, and the other pencil marking in another color, said marks deviating to one side or the other of the center line of the tape, and being in one color or the other, as again referred to.

On top of the body 21, I have shown a cushion member of resilient material, designated 33, with an open center, and within which open center said shaft 29 is provided with a coupling 34, coupling said shaft 29 to another shaft 35, through a bearing block 36, screwed into the enlarged head 37, of a body member 38, shown to be triangular in cross section, Fig. 5. The shaft 35 is provided with a stuffing box 39, in said block 36, as clearly indicated, and at its upper end said shaft 35 is provided within the chamber 37', in the enlarged lower end 37, of the body 38, with an internal gear 40, as shown in said Figs. 1 and 4. This construction, it will be seen, permits the detachment of the parts 37, 36, and 35, from the upper end of the case or housing 12, and between which parts is the cushion member 33, to take any jar or shock, the coupling 34, permitting said shafts 29 and 35 to be readily disconnected or uncoupled.

In order to make sure that the pencils and the pencil carrying arm 30 are properly adjusted for the start, relative to the paper, and to a selected compass direction, I have provided a sight opening 41, with closure screw 42 therefor, through the upper end of the tube 10 and body 21, for setting all parts relative to each other for starting the drill pipe down into the well.

I have described one form of mechanism for recording or indicating on a tape or sheet the rotation taking place in the instrument and the drill pipe carrying it. I will now describe one form of actuating mechanism which is operated by contact with the wall of the well.

Secured to the body 38, shown to be triangular in cross section in this form, are three supporting springs, 43, 44 and 45, secured in each case to the body 38 by means of screws 46, 46, and each provided at its opposite ends with bearing members as 47 and 47, in which are mounted the spindle ends, 48, 48, of rolling or contact elements, 49, shown as having fluted surfaces for engagement with the wall of the well. Said rolling elements are free to move axially sufficiently to compensate for the radial movement thereof as the springs flex, and as will be understood from the showing made and the cross sectional detail in Fig. 7, taken on line 7—7 of Fig. 1. The lower end of each spindle is coupled by means of a universal coupling 50, with a shaft 51, which in turn is connected by means of another universal coupling 52, with a short shaft 53, provided on the inside of the member 37 with a pinion 54, in mesh with the gear 40. A sliding guide member 55 is attached to the upper bearing 47, with its upper end sliding in a slideway 56 in the head 38' of the body 38. The lower bearing 47 also has a channel sliding guide member 57 pivotally connected with it, with its lower end sliding in a slot or socket 57' in the top of the member 37, substantially as shown. It is clear that there are three sets of the rolling contact elements 49, with the connections just described, and that they are all connected through the short shafts, as 53, and pinions 54 with the gear 40, which operates the shaft 35 and its connections to the pencil carrying arm or block 30, previously described. The head 38' is provided with a threaded socket 38ᵃ, for connection to a drill pipe, designated 58, Fig. 8, in which my invention is shown connected into a line of drill pipe and in a well.

In order to avoid the possibility of a cavity in a well such as C, Fig. 8, two of my instruments can be connected into the line of drill pipe, whereby in case of such cavity, with one set of contact elements positioned therein, the other set above will be in engagement with the wall of the well and will operate the mechanism to record any twist in the drill pipe, as before described.

In Fig. 9, I have illustrated how my instrument can be lowered into a well by means of a cable, for which I use a short section of pipe 59, with swivel connection at 60 with a cable 61. Above the instrument I have shown some guide springs 62.

It will be understood that the proper ratios between the rolling or contact elements and the well and the pinions and gear must be the same, that is, the ratio between the gear 40 and the pinions 54, must be the same as the ratio between the contact elements 49 and the well, so that the amount of any rotation of the drill pipe in the well will be correspondingly compensated for in the recording instrument and the marking means maintained in a constant relative position with compass directions.

In Fig. 10, I have shown a section of paper tape 20, and have indicated thereon a record as the same would be marked by my instrument, indicating in light broken lines the arm or pencil carrying block 30.

Assuming that the drill pipe and the instrument are all connected together to be let down into a well and that the left, Fig. 1, is north and, as there shown the direction of the paper travel is north and the position of the pencil arm is north, and the pencil 31 is down on the center line of the paper or tape, as in Fig. 10. The peek hole 41 in the body 21 and case 12, is for the purpose of seeing that this starting position of all parts is as desired. As shown in Fig. 1, so in Fig. 10, at the top thereof, the pencil arm 30 stands north and south, with the outer pencil 31 on the center line of the tape 20, and the tape moves north. Said tape is carried through and back through the integral table 10a, which, being a part of the case 10 and the case 10 being keyed to the housing 12, connected to the drill pipe, must turn therewith, so that said tape must turn with the drill pipe, but the pencils and their carrying arm are maintained in the north, or starting position. As indicated in Fig. 10, the drill pipe and instrument moved down into the well some distance before any rotation is indicated. Then from the last or lower "North" the instrument with the drill tube turns to the east as indicated by the heavy line, which is the outer pencil, moving in the outer slot 27. The rotation continues until a quarter turn of the paper and the instrument is indicated at "East" but the arm 30 is maintained in the north and south position through the mechanical connections. The pencil 31 has thus moved through the half of the slot, or rather the half of the slot 27 has moved over the pencil, and at "East" on said Fig. 10, the broken lines indicate that the other pencil, 32, in slot 28, has been moved out and the continued turn of the pipe and instrument is indicated by said broken line. At "South" it will be understood the paper and instrument has made a half turn. It continues to turn until "Southeast" is indicated, which continues down without turning for a distance, and then returns a distance to "South". Thus each rotation movement of the paper with the instrument is recorded by the pencils which are maintained in the starting position.

Referring now to Figs. 11 to 13 inclusive, I have shown a simple mechanism which can be connected into the instrument for indicating on the tape any enlargement of the well and which would change the ratio between the contact or operating elements 49 and the well at such enlarged position.

The tape 20 is shown extended downwardly in the tube or housing 10, within the outer case 12, as clearly indicated, and which might be a continuation of Fig. 1, as here extended. Within said inner tube or housing 10, I have provided a plate or table, 60, set vertically in said tube and along which said tape 20 moves, whereby to receive markings thereon. I have shown two radially disposed and reciprocating rods or members, 61 and 62, operating through two stuffing boxes, 63 and 64, in the outer case 12, the inner tube having openings 65 and 66 therethrough to accommodate said stuffing boxes, substantially as shown. The outer ends of said members 61 and 62 are pivotally connected, as at 67 and 68, with spring members 69 and 70, having their opposite ends slidably confined in retaining sockets, as 71 and 72, formed on the outside of the case 12. Said spring members 69 and 70 are normally pressed outwardly by means of small coiled springs, as 73, 73 and 74, 74, set between the case 12 and said springs, and held in place by means of small lugs 75, 75, and 76, 76 formed on the case 12 and the inner side of the springs 69 and 70. Said springs are shown in full lines as bearing outwardly against the inside of the well, and in light broken lines, I have illustrated how said springs are moved outwardly, moving said members 61 and 62 therewith. On the inner ends of said members 61 and 62, are marking devices, designated as a whole, 61' and 62', and shown as spring pressed pencils bearing against the tape 20 and the backing table or plate 60, Fig. 12, and as said members 61 and 62 are moved outwardly with the springs, 69 and 70, as said instrument moves into an enlarged portion of the well, said marking devices record such expansion on the tape, as indicated by the marks made by said marking devices, Fig. 11. Thus as the tape 20 is moved down through the instrument to receive the record thereon of any twisting movement of the drill pipe and instrument carried thereby, there will also be recorded thereon as it moves down into the well any enlargements of the hole which would cause a changed ratio between the contact elements 49, 49, which control the recording mechanism, but if these enlargements are also recorded on the tape, then the proper calculations can be made, for the records will be related on the tape.

It will be understood, of course, that when the instruments are set for a starting position, as hereinbefore described, that the movement of the drill pipe and instruments down into the well as regulated and properly related to the movement of the tape through the instrument, as fully set forth in the application referred to.

From the foregoing description, it will be understood that the instrument herein described for indicating the rotation of drill pipe as it moves down into a well, the mechanism associated therewith for marking on the same tape the enlargements which may occur in a well, and the instrument described in the application hereinbefore referred to for indicating or recording the deviation from the perpendicular, are all enclosed in the same case or housing and coupled into a drill pipe, the mechanism operating to move the tape slowly and regularly through the instruments and the instruments with the drill pipe being lowered into the well at a related speed so that the actuation of the various marking devices on the tape can be related to the movement and position of the instruments into the well.

While I have shown and described one practical embodiment of the invention for illustrative and descriptive purposes, I am aware that many changes in details can be made herein without departing from the spirit thereof, and I do not, therefore, limit the invention to the details of construction and arrangement shown, except as I may be limited by the hereto appended claims.

I claim:

1. In mechanism for indicating rotation in drill pipe as it moves into a well, contact elements carried thereby and positioned to engage the wall of the well, recording mechanism for recording rotating movement about a center, a receiving sheet carried thereby and turning therewith, and operating connections from said contact elements and said recording mechanism, whereby the movement of said contact elements operates said recording mechanism and records on said sheet said rotation.

2. In mechanism for indicating rotation in drill pipe as it moves into a well, a rotatable contact element carried thereby and adapted to engage the wall of a well and to be rotated by such engagement, recording mechanism for recording rotating movement about a center, a receiving sheet carried thereby and turning therewith, and operating connections from said contact element to said recording mechanism, whereby the rotation of said contact element operates said recording mechanism and records on said sheet relative rotative movement of said mechanism.

3. Means for recording the relative rotative movement of a drill pipe in a well, including an operating element positioned to engage and be actuated by contact with the wall of said well, recording mechanism including a movable sheet and marking device adapted to mark said sheet as it moves, and operating connections from said operating element to said recording mechanism for operating said recording mechanism.

4. Means for recording the relative rotative movement of a drill pipe in a well, including a rotative operating element positioned to engage and be rotated by engagement with the wall of a well, recording mechanism including a movable sheet and marking means to be actuated for marking a record on said sheet, and operating connections from said operating element to said recording mechanism for operating said recording mechanism.

5. Means for recording the relative rotative movement of a drill pipe in a well, including an operating element positioned to engage and be actuated by contact with the wall of said well, a strip of paper movable lengthwise, a recording mechanism through which said strip of paper is movable, said recording mechanism and paper being supported to turn with said drill pipe, marking means adapted to be moved into and out of marking contact with said paper, and operating connections from said operating element to said marking means for controlling the same.

6. Recording means for recording rotation of drill pipe in a well including in combination contact elements positioned to yieldingly engage the wall of a well and to be rotated about their axes by reason of said contact as said pipe turns, a tape carried by said recording means and turning therewith and movable lengthwise through said recording means, marking means revolubly supported in marking engagement with said tape, and operating connections from said contact elements to said recording means for maintaining said marking means in its original position while permitting the paper to turn with the recording means under said marking means.

7. Recording means for recording rotation of drill pipe moving down into a well, in combination, revoluble elements yieldingly mounted to engage and be turned by contact with the wall of a well, a receiving tape, marking devices adapted to mark upon said receiving tape when moved into contact therewith, operating connections from said revoluble elements to said marking devices, said revoluble elements, receiving tape and supports therefor turning bodily with a drill pipe to which it is connected, said operating connections between the revoluble elements and the marking devices operating to maintain said marking devices in a fixed position relative to compass directions during the turning of the revoluble elements and receiving tape, for the purpose described.

8. A recording mechanism for recording rotation of a drill pipe as it moves down into a well, including operating elements adapted to engage and be operated by contact with the wall of said well, a tape for receiving the record of twist, marking devices to engage and mark the record on said tape, operating connections from said operating elements to said marking devices for controlling the position thereof relative to the tape, and means for controlling the marking devices for differently marking different positions of twist of said tape thereunder.

9. A recording mechanism for recording rotation of a drill pipe as it moves down into a well including operating elements adapted to engage and be operated by contact with the wall of said well as said operating elements are turned bodily in said well, means carrying a tape and adapted to be connected to a drill pipe to turn therewith, a tape adapted to be moved lengthwise through said carrying means, marking devices pivotally mounted and positioned to engage and mark on said tape as it turns edgewise under said marking devices, operating connections from said operating elements to said marking devices for maintaining them in a predetermined position, and means for selectively controlling the marking device to operate in marking the record on said tape.

Signed at Los Angeles, Los Angeles County, California, this 15 day of Nov., 1929.

WILLIAM J. WILLIAMS.